(12) United States Patent
Kubo et al.

(10) Patent No.: US 11,582,155 B2
(45) Date of Patent: Feb. 14, 2023

(54) COMMUNICATION CONTROL APPARATUS AND COMMUNICATION CONTROL METHOD

(71) Applicant: NIPPON TELEGRAPH AND TELEPHONE CORPORATION, Tokyo (JP)

(72) Inventors: Takahiro Kubo, Tokyo (JP); Yu Nakayama, Tokyo (JP); Daisuke Hisano, Tokyo (JP); Yoichi Fukada, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/252,346

(22) PCT Filed: Jun. 7, 2019

(86) PCT No.: PCT/JP2019/022734
§ 371 (c)(1),
(2) Date: Dec. 15, 2020

(87) PCT Pub. No.: WO2020/003975
PCT Pub. Date: Jan. 2, 2020

(65) Prior Publication Data
US 2021/0266263 A1    Aug. 26, 2021

(30) Foreign Application Priority Data
Jun. 28, 2018  (JP) .............................. JP2018-123576

(51) Int. Cl.
*H04L 47/22*  (2022.01)
*H04L 47/625* (2022.01)

(52) U.S. Cl.
CPC .......... *H04L 47/225* (2013.01); *H04L 47/627* (2013.01)

(58) Field of Classification Search
CPC ......... H04L 47/30; H04L 47/10; H04L 47/14; H04L 43/0894; H04L 47/122;
(Continued)

(56) References Cited

U.S. PATENT DOCUMENTS 6,952,401 B1 * 10/2005 Kadambi ............. H04L 47/125
370/232
8,036,226 B1 * 10/2011 Ma .......................... H04L 45/24
370/395.21
(Continued)

OTHER PUBLICATIONS

Docomo, "Docomo 5G White Paper", Sep. 2014. <https://www.nttdocomo.co.jp/corporate/technology/whitepaper_5g/>.
(Continued)

*Primary Examiner* — Kodzovi Acolatse
*Assistant Examiner* — Mon Cheri S Davenport
(74) *Attorney, Agent, or Firm* — Harness, Dickey & Pierce, P.L.C.

(57) ABSTRACT

A communication control apparatus includes an observed data rate acquiring unit configured to acquire observed data rates indicating input data rates of queues, the observed data rates being observed in a layer 2 switch, a threshold value storage unit configured to store predetermined threshold values of the queues, a shaping rate determination unit configured to determine a shaping rate of each queue based on both observed data based on an observed data rate of the observed data rates acquired by the observed data rate acquiring unit and a threshold value of the predetermined threshold values stored in the threshold value storage unit, and a shaping rate setting unit configured to set, in the layer 2 switch, the shaping rate of each queue determined by the shaping rate determination unit.

4 Claims, 5 Drawing Sheets

(58) Field of Classification Search
CPC ....... H04L 45/306; H04L 45/38; H04L 47/29; H04L 47/32; H04L 41/5022; H04L 43/0829; H04L 43/16; H04L 47/11; H04L 47/125; H04L 47/225; H04L 49/90; H04L 2012/5636; H04L 45/24; H04L 47/22; H04L 47/52; H04L 47/621; H04L 47/6255; H04W 28/0278; H04W 28/10; G06F 3/067; G06F 2206/1012
See application file for complete search history.

(56) References Cited

U.S. PATENT DOCUMENTS

| | | | | |
|---|---|---|---|---|
| 9,036,481 | B1* | 5/2015 | White | H04L 47/18 |
| | | | | 370/236 |
| 2004/0117794 | A1* | 6/2004 | Kundu | G06F 9/505 |
| | | | | 718/105 |
| 2006/0215550 | A1* | 9/2006 | Malhotra | H04L 47/263 |
| | | | | 370/229 |
| 2010/0165845 | A1* | 7/2010 | Lott | H04L 47/10 |
| | | | | 370/328 |
| 2012/0224483 | A1* | 9/2012 | Babiarz | H04W 76/15 |
| | | | | 370/232 |

OTHER PUBLICATIONS

Craig Gunther, "What's New in the World of IEEE 802.1 TSN", Standards News, IEEE Communications Magazine, Communications Standards Supplement, Sep. 2016, pp. 12-15.

Takahiro Kubo et al., Evaluation of Latency for Offering a Diversity of Services in the Layer 2 Network, IEICE Communication Society Conference 2016, Sep. 2016, B-8-25, p. 155.

* cited by examiner

Fig. 1

| FLOW | L2 SWITCH | REGISTERED DATA RATE |
|---|---|---|
| #1 | #1 | D1 |
| #2 | #2 | D2 |
| #3 | #3 | D3 |
| ⋮ | ⋮ | ⋮ |
| #m | #s | D6 |

| FLOW | L2 SWITCH | OBSERVED DATA RATE |
|---|---|---|
| #1 | #1 | D1' |
| #2 | #2 | D2' |
| #3 | #3 | D3' |
| ⋮ | ⋮ | ⋮ |
| #n | #s | D6' |

| QUEUE | FLOW | DATA RATE INCREASE |
|---|---|---|
| #1 | #1、#2 | R1 |
| #2 | #3、#4 | R2 |
| #3 | #5、#6 | R3 |

COMMUNICATION CONTROL APPARATUS AND COMMUNICATION CONTROL METHOD

CROSS-REFERENCE TO RELATED APPLICATIONS

This application is a 371 U.S. National Phase of International Application No. PCT/JP2019/022734 filed on Jun. 7, 2019, which claims priority to Japanese Application No. 2018-123576 filed on Jun. 28, 2018. The entire disclosures of the above applications are incorporated herein by reference.

TECHNICAL FIELD

The present disclosure relates to a layer 2 (hereinafter referred to as "L2") network technology.

BACKGROUND ART

In recent years, a centralized radio access network (C-RAN) configuration has been studied for the purpose of efficiently accommodating increasing mobile traffic (see Non Patent Literature 1). In a C-RAN, a large number of pieces of radio equipment (RE) are arranged at a high density and are connected to radio equipment controls (RECs) that are arranged in an aggregated manner. In IEEE802.1CM, studies are underway to accommodate fronthaul traffic in an L2 network (see Non Patent Literature 2). On the other hand, studies are underway to accommodate, in an access network, traffic tolerant of delay (delay-tolerant traffic) represented by a part of the Internet of Things (IoT). In view of this, a study on a multi-service accommodation access network (multi-service network) in which delay-tolerant traffic is accommodated in the same L2 network in addition to fronthaul and backhaul has been reported on (see Non Patent Literature 3).

In a service that flows through a multi-service network, a large number of terminals may connect to an application server on the network simultaneously. This may increase data flows (hereinafter referred to as "flows") and apply a load to a server and an L2 network to which the terminals connect.

On the other hand, each L2 switch generally shapes a flow flowing through the L2 switch such that an unexpected load is not applied to the server and the L2 network.

CITATION LIST

Non Patent Literature

Non Patent Literature 1: Docomo 5G White Paper, https://www.nttdocomo.co.jp/corporate/technology/whitepaper_5 g/Non
Patent Literature 2: Craig Gunther, "What's New in the World of IEEE 802.1 TSN", Standards News, IEEE Communications Magazine, Communications Standards Supplement, September 2016
Non Patent Literature 3: Takahiro Kubo et al., "Evaluation of delay in L2 network accommodating multi-services", Proceedings of the 2016 IEICE Communications Society Conference, Vol. 2, B-8-25, p. 155, 2016

SUMMARY OF THE INVENTION

Technical Problem

Incidentally, for example, even in a case where a specific flow is input at a data rate significantly higher than a normally expected input data rate, the specific flow alone can be shaped when the L2 switch has allocated queues and shapers individually to a plurality of transferred flows. In this way, only a flow which has caused a problem can be shaped, thus improving the fairness of the entire network. However, an actual L2 switch may sometimes be provided with a smaller number of queues and shapers than the number of transferred flows. In this case, a plurality of flows are aggregated into an aggregate flow and the aggregate flow is input to one queue or shaper.

For example, if one flow included in an aggregate flow is input at a data rate significantly higher than a normally expected input data rate in such a case, the input data rate of the entire aggregate flow may become higher than a normally expected input data rate.

A shaper cannot select, from the aggregate flow, a flow that has caused an increase in the input data rate (a flow that has been input at a data rate significantly higher than a normally expected input data rate). Therefore, the shaper shapes the entire aggregate flow. As a result, flows other than the flow that causes the increase of the input data rate are also collectively shaped at a shaping rate according to the data rate higher than the normally expected input data rate. This causes a problem of impairing the fairness of the entire network.

In view of the above circumstances, an object of the present disclosure is to provide a technology capable of performing shaping in an L2 network without impairing the fairness of the entire network.

Means for Solving the Problem

An aspect of the present disclosure provides a communication control apparatus including an observed data rate acquiring unit configured to acquire observed data rates indicating input data rates of queues, the observed data rates being observed in a layer 2 switch, a threshold value storage unit configured to store predetermined threshold values of the queues, a shaping rate determination unit configured to determine a shaping rate of each queue based on both observed data based on an observed data rate of the observed data rates acquired by the observed data rate acquiring unit and a threshold value of the predetermined threshold values stored in the threshold value storage unit, and a shaping rate setting unit configured to set, in the layer 2 switch, the shaping rate of each queue determined by the shaping rate determination unit.

An aspect of the present disclosure provides the communication control apparatus, wherein the threshold value is a registered data rate indicating a predetermined input data rate of each queue, and the shaping rate determination unit is configured to, when the observed data rate exceeds the registered data rate, identify an abnormal flow indicating a flow that causes the observed data rate to exceed the registered data rate.

An aspect of the present disclosure provides the communication control apparatus, wherein the shaping rate determination unit is configured to change allocation of a plurality of flows to the queue where the observed data rate exceeds the registered data rate, such that the plurality of flows are allocated individually to a plurality of queues, and identify, as the abnormal flow, a flow allocated to a queue where the observed data rate exceeds the registered data rate in the changed allocation.

An aspect of the present disclosure provides the communication control apparatus, wherein the threshold value is a data rate increase indicating a predetermined increase in the input data rate of each queue, wherein the shaping rate determination unit is configured to, when an increase in the observed data rate exceeds the data rate increase, identify a flow that causes the increase in the observed data rate to exceed the data rate increase.

An aspect of the present disclosure provides a communication control method including acquiring observed data rates indicating input data rates of queues, the observed data rates being observed in a layer 2 switch, storing predetermined threshold values of the queues, determining a shaping rate of each queue based on both observed data based on an observed data rate of the observed data rates acquired in the acquiring and a threshold value of the predetermined threshold values stored in the storing, and setting, in the layer 2 switch, the shaping rate of each queue determined in the determining.

Effects of the Invention

According to the present disclosure, shaping can be performed in an L2 network without impairing the fairness of the entire network.

DESCRIPTION OF EMBODIMENTS

First Embodiment

Hereinafter, a first embodiment of the present disclosure will be described with reference to the drawings.

Configuration of Network System

An example of a configuration of a network system including a network controller 11 will be described below.

Figure 1:
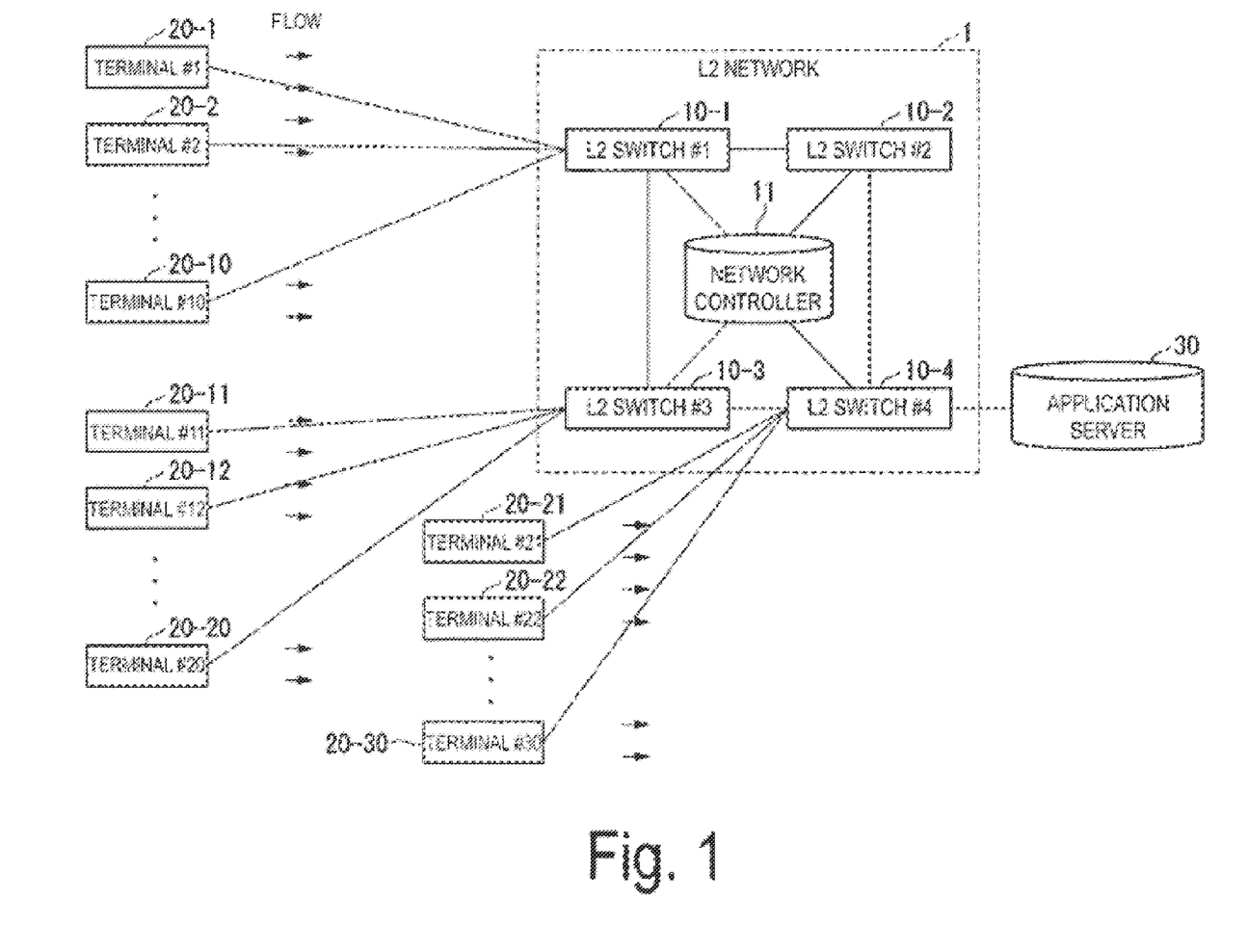
FIG. 1 is a diagram illustrating a configuration of a network system including a network controller 11 according to a first embodiment of the present disclosure.

FIG. 1 is a diagram illustrating the configuration of the network system including the network controller 11 according to the first embodiment of the present disclosure. As illustrated in FIG. 1, the network system includes an L2 network 1, 30 terminals (terminals 20-1, 20-2, . . . , and 20-30), and an application server 30.

The terminals 20-1, 20-2, . . . , and 20-30 are given identification numbers. The identification numbers of the terminals 20-1, 20-2, . . . , and 20-30 are "#1", "#2", . . . , and "#30", respectively.

In the following description, the terminals 20-1, 20-2, . . . , and 20-30 may be simply referred to as "terminals 20" when it is not necessary to distinguish between them.

As illustrated in FIG. 1, the terminals 20 and the application server 30 are connected via the L2 network 1 and transfer devices (not illustrated). In the network system illustrated in FIG. 1, the L2 network 1 and the application server 30 are directly connected to each other, but a plurality of transfer devices may be interposed between them.

The L2 network 1 is configured as a multi-service network.

As illustrated in FIG. 1, the L2 network 1 includes four L2 switches (L2 switches 10-1, 10-2, . . . , and 10-4) and the network controller 11.

The L2 switches 10-1, 10-2, . . . , and 10-4 are given identification numbers. The identification numbers of the L2 switches 10-1, 10-2, . . . , and 10-4 are "#1", "#2", . . . , and "#4", respectively.

In the following description, the L2 switches 10-1, 10-2, . . . , and 10-4 may simply be referred to as "L2 switches 10" when it is not necessary to distinguish between them.

The network controller 11 may be housed in the same housing as the transfer devices (not illustrated).

As illustrated in FIG. 1, the L2 switches 10-1, 10-2, . . . , and 10-4 and the network controller 11 are connected to each other.

As illustrated in FIG. 1, the L2 switch 10-1 is connected to the L2 switches 10-2 and 10-3. The L2 switch 10-2 is connected to the L2 switches 10-1 and 10-4. The L2 switch 10-3 is connected to the L2 switches 10-1 and 10-4. The L2 switch 10-4 is connected to the L2 switches 10-2 and 10-3.

As illustrated in FIG. 1, the terminals 20-1, 20-2, . . . , and 20-10 are communicatively connected to the L2 switch 10-1. Moreover, the terminals 20-11, 20-12, . . . , and 20-20 are communicatively connected to the L2 switch 10-3. Furthermore, the terminals 20-21, 20-22, . . . , and 20-30 are communicatively connected to the L2 switch 10-4.

The number of terminals 20 is not limited to 30. The number of L2 switches 10 is also not limited to 4. Further, the number of terminals 20 communicatively connected to each L2 switch 10 is not limited to that of the configuration of the network system illustrated in FIG. 1. Note that other L2 switches 10 connected to each L2 switch 10 are not limited to those of the configuration of the L2 network 1 illustrated in FIG. 1.

Each L2 switch 10 outputs an input frame to another L2 switch 10 adjacent thereto. This allows the L2 network 1 to relay a frame input from a terminal 20 (frame to be transferred therefrom) and output the frame to another terminal 20 via a server in a higher level network (core network) connected to the L2 network 1. For example, in mobile edge computing in which terminals below edge nodes are connected to each other, the L2 network 1 relays a frame to be transferred and outputs the frame to another terminal 20 through an edge node near the destination of the frame.

The network controller 11 stores in advance a registered data list Ls1 which is a list of registered data items in which identification numbers for identifying flows input to the L2 switches 10 and input data rates are associated with each other. The values of input data rates (hereinafter referred to as "registered data rates") indicated by the registered data items are used as threshold values which will be described in detail later.

An input data rate indicates, for example, the sum of the amounts of packets flowing into a queue in a certain period of time. The unit of the input data rate is, for example, B/s (bytes per second).

The network controller 11 generates the registered data list Ls1, for example, on the basis of information acquired from the application server 30 in advance and stores this list. Alternatively, for example, the network controller 11 acquires the registered data list Ls1 from the application server 30 in advance and stores this list.

The network controller 11 monitors all queues of each L2 switch 10. Specifically, the network controller 11 acquires, from each L2 switch 10, the values of the input data rates of queues at regular intervals. Based on the acquired information, the network controller 11 generates an observed data list Ls2 which is a list of observed data items in which the identification numbers for identifying flows input to the L2 switches 10 and the acquired input data rates (hereinafter referred to as "observed data rates") are associated in sets.

The network controller 11 compares the observed data rates with the registered data rates which are threshold values. Then, based on the comparison result, the network controller 11 selects a flow that has caused an increase in an observed data rate (hereinafter referred to as an "abnormal flow"). Processing of selecting the abnormal flow will be described later in detail.

Configuration of Registered Data List

Figure 2:
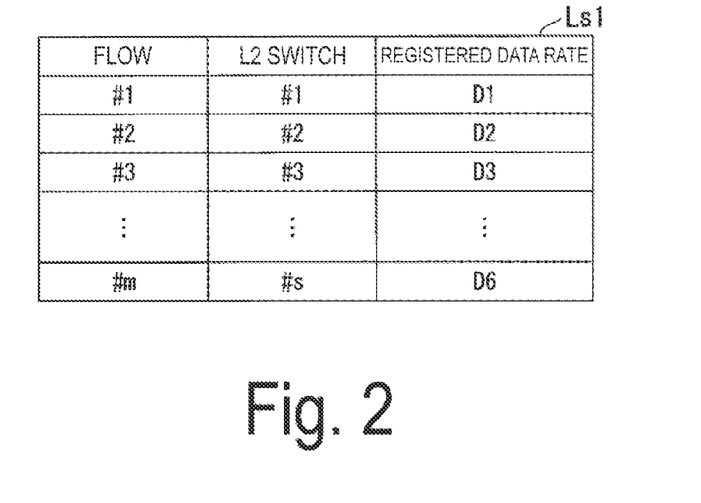
FIG. 2 is a diagram illustrating a configuration of a registered data list Ls1 stored in the network controller 11 according to the first embodiment of the present disclosure.

Hereinafter, an example of the configuration of the registered data list Ls1 will be described. FIG. 2 is a diagram illustrating the configuration of the registered data list Ls1 stored in the network controller 11 according to the first embodiment of the present disclosure.

As illustrated in FIG. 2, the registered data list Ls1 is data in a list format in which the identification numbers ("#1", "#2", . . . , and "#m") of flows input to the L2 switches 10, the identification numbers ("#1", "#2", . . . , and "#s") of the L2 switches 10, and the registered data rates are associated with each other.

D1, D2, and the like are written as values of the registered data rates in the registered data list Ls1 illustrated in FIG. 2, but actually, specific set values of the registered data rates are registered.

In this way, the registered data rates are identified for the respective flows and managed as a field in the registered data list Ls1.

Configuration of Observed Data List

Figure 3:
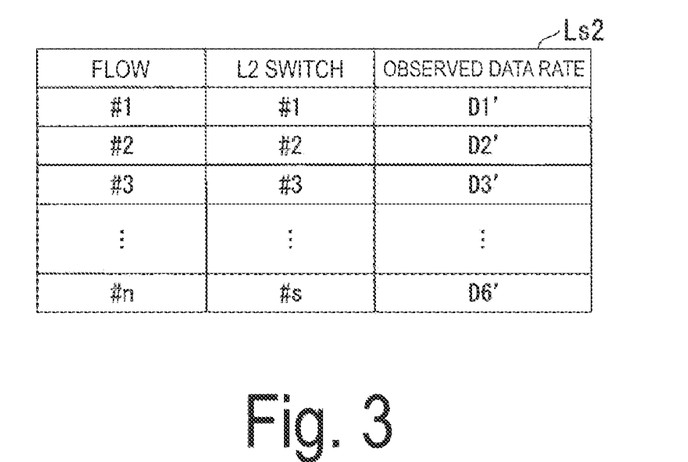
FIG. 3 is a diagram illustrating a configuration of an observed data list Ls2 generated by the network controller 11 according to the first embodiment of the present disclosure.

An example of the configuration of the observed data list Ls2 will be described below. FIG. 3 is a diagram illustrating the configuration of the observed data list Ls2 generated by the network controller 11 according to the first embodiment of the present disclosure.

As illustrated in FIG. 3, the observed data list Ls2 is data in a list format in which the identification numbers ("#1", "#2", . . . , and "#n") of flows input to the L2 switches 10, the identification numbers ("#1", "#2", . . . , and "#s") of the L2 switches 10, and the observed data rates are associated with each other.

Here, a flow indicated by each identification number in the observed data list Ls2 may be a flow in which a plurality of flows are aggregated.

D1', D2', and the like are written as values of the observed data rates in the observed data list Ls2 illustrated in FIG. 3 but actually, the specific values of actual measurements of the observed data rates are registered.

The registered data list Ls1 illustrated as an example in FIG. 2 and the observed data list Ls2 illustrated as an example in FIG. 3 are not configured to be able to manage the same flow input from a plurality of the L2 switches 10, but the configuration thereof is not limited to this. The registered data list Ls1 and the observed data list Ls2 may also be configured to be able to manage the same flow input from a plurality of the L2 switches 10.

Abnormal Flow Selection Processing

Figure 4:
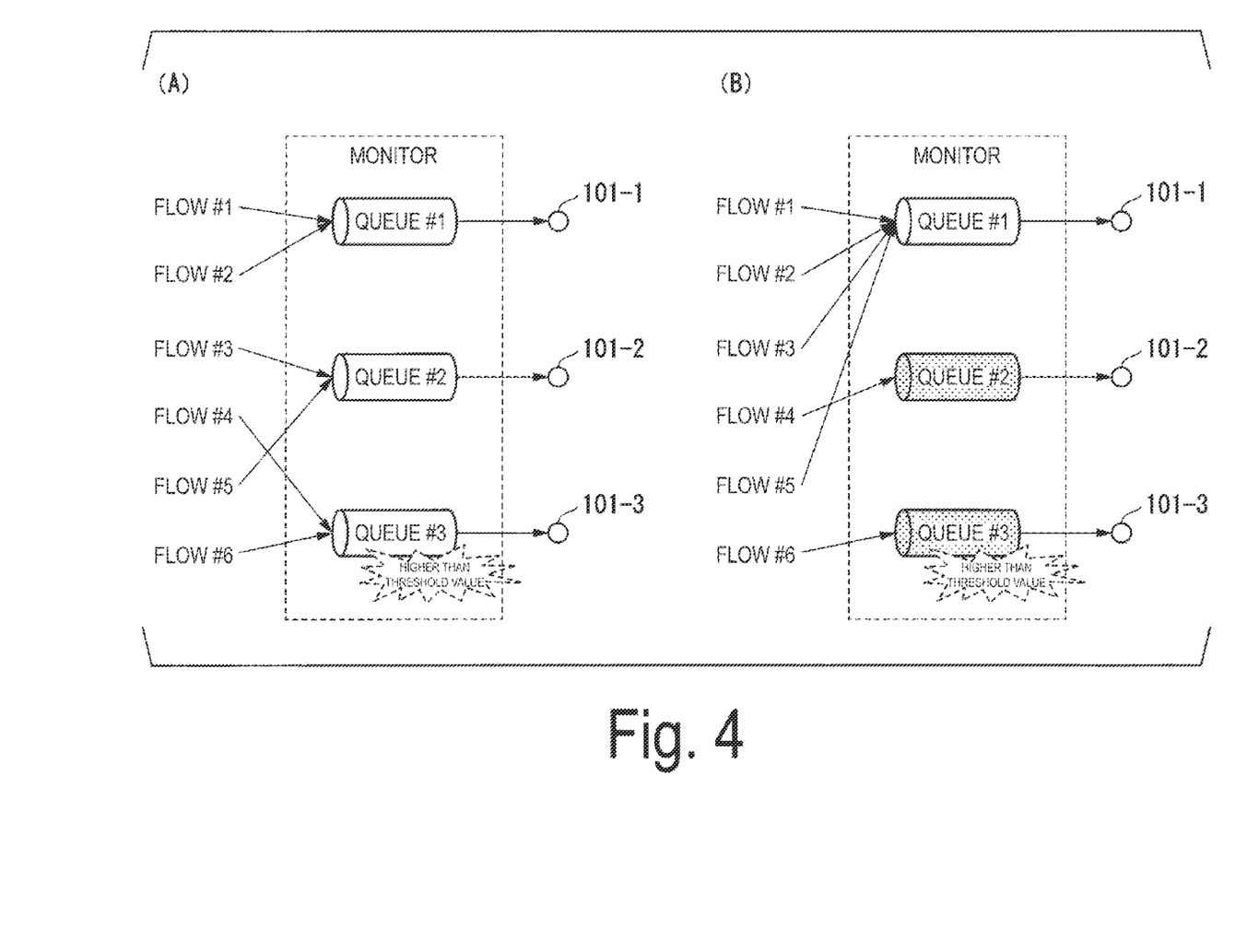
FIG. 4 is a schematic diagram for explaining an abnormal flow selection processing performed by the network controller 11 according to the first embodiment of the present disclosure.

An example of an abnormal flow selection processing performed by the network controller 11 will be described below. FIG. 4 is a schematic diagram for explaining the abnormal flow selection processing performed by the network controller 11 according to the first embodiment of the present disclosure.

For example, six flows (flows #1, #2, . . . , and #6) are input to a certain L2 switch 10 as illustrated in FIG. 4(A). Then, the network controller 11 aggregates the six input flows into three corresponding to the number of queues. The network controller 11 allocates the three aggregate flows to the three respective queues (queue #1, queue #2, and queue #3). The three flows allocated to the respective queues are shaped by three shapers (shapers 101-1, 101-2, and 101-3) corresponding to the three respective queues.

The network controller 11 compares a registered data rate and an observed data rate for each queue. Here, there may be a case where a flow in which a plurality of flows are aggregated is input to a queue as in the example illustrated in FIG. 4(A). In this case, the network controller 11 compares the sum of registered data rates corresponding to the plurality of flows with the sum of observed data rates corresponding to the same.

The network controller 11 starts selecting an abnormal flow if the result of the comparison is that an observed data rate exceeds a preset threshold value (that is, a registered data rate) in a certain queue.

For example, the network controller 11 allocates the flows #1 and #2 out of the six input flows (flows #1, #2, . . . , and #6) to the queue #1 as illustrated in FIG. 4(A). Further, the network controller 11 allocates the flows #3 and #5 to the queue #2. Further, the network controller 11 allocates the flows #4 and #6 to the queue #3.

Here, the case where the observed data rate of the queue #3 exceeds the threshold value will be considered. That is, this is the case where the observed data rate of the queue #3 exceeds the sum of the registered data rates of flows #4 and #6.

In this case, the network controller 11 separates the flows #4 and #6 allocated to the queue #3 the observed data rate of which exceeds the threshold value and reallocates the separated flows #4 and #6 to the queues #2 and #3, respectively, as illustrated in FIG. 4(B). Further, the network controller 11 reallocates the flows (that is, the flows #1, #2, #3, and #5) allocated to the queues (that is, the queues #2 and #3) the observed data rates of which do not exceed their threshold values to the remaining queue (that is, the queue #1).

The network controller 11 separates a flow allocated to each queue which exceeds a threshold value into individual flows and reallocates the separated flows to individual queues in this way. Then, the network controller 11 again identifies a queue the observed data rate of which exceeds a threshold value. Here, when a flow allocated to the specified queue is one in which a plurality of flows are aggregated, the network controller 11 repeats the processing of separating the flow into individual flows and reallocating the separated flows to individual queues. The network controller 11 uniquely identifies an abnormal flow by repeating the above processing until a flow allocated to a queue the observed data rate of which exceeds a threshold value is not one in which a plurality of flows are aggregated.

Operation of Network Controller

An example of the operation of the network controller 11 in the abnormal flow selection processing will be described below.

Figure 5:
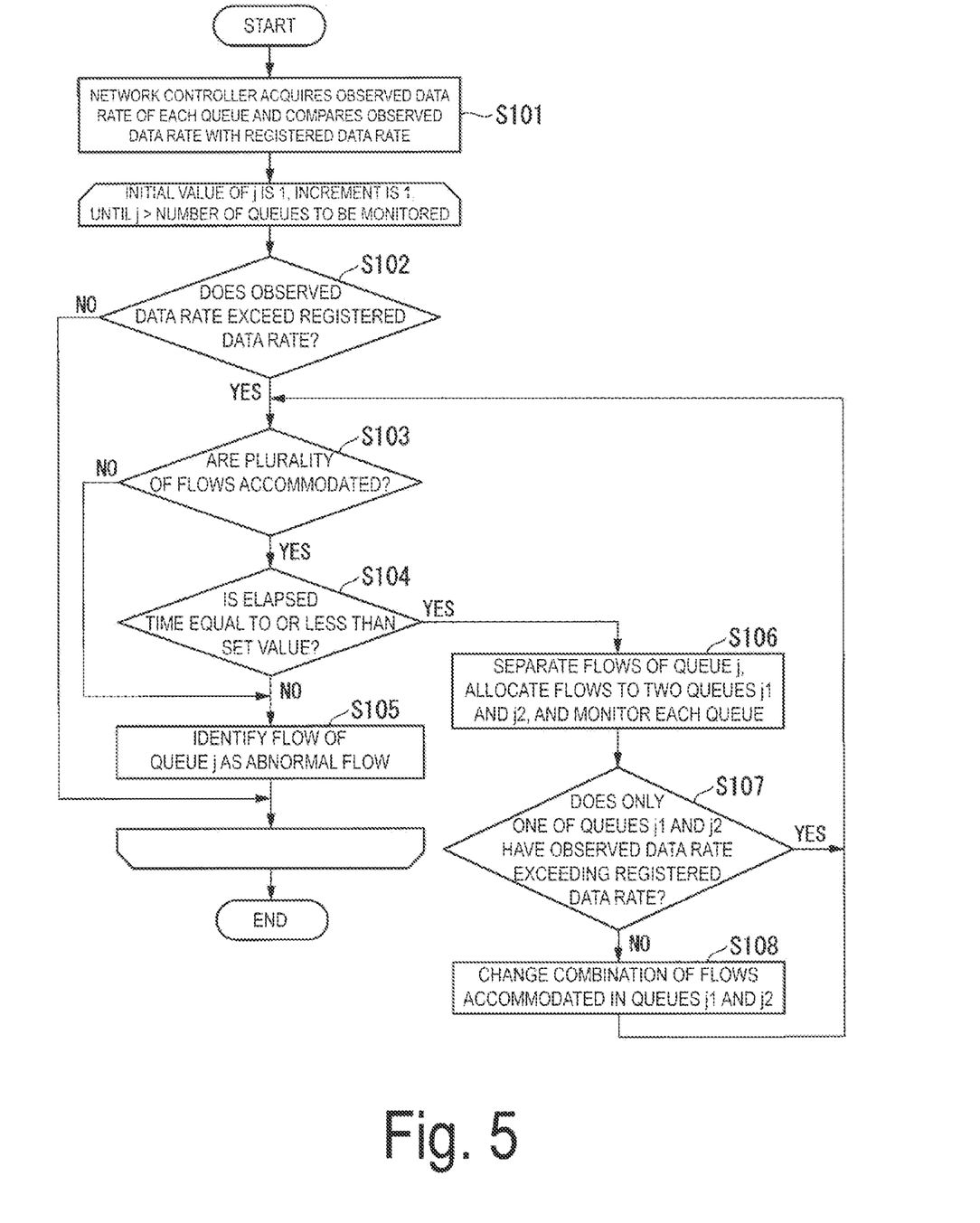
FIG. 5 is a flowchart illustrating an operation of the network controller 11 according to the first embodiment of the present disclosure.

FIG. 5 is a flowchart illustrating the operation of the network controller 11 according to the first embodiment of the present disclosure. The abnormal flow selection processing illustrated in the flowchart of FIG. 5 is executed at regular intervals.

The network controller 11 acquires, from each L2 switch 10, an observed data rate for each queue to be monitored. The network controller 11 compares the acquired observed data rate for each queue with a registered data rate of a flow allocated to the queue (the sum of registered data rates when the flow is one in which a plurality of flows are aggregated) (step S101).

The network controller 11 performs the following determination processing for each queue to be monitored.

If the result of comparing the observed data rate with the registered data rate is that the observed data rate does not exceed the registered data rate (No in step S102), the network controller 11 proceeds to the determination processing for the next queue. Alternatively, the network controller 11 terminates the abnormal flow selection processing illustrated in the flowchart of FIG. 5 when the determination processing is completed for all queues that are targets of the determination processing.

If the result of comparing the observed data rate with the registered data rate is that the observed data rate exceeds the registered data rate (Yes in step S102), the network controller 11 checks whether a plurality of flows are accommodated in the queue (queue j) that is the target of the determination processing (that is, whether a flow in which a plurality of flows are aggregated is allocated to the queue) (step S103).

If only one flow, not a plurality of flows, is accommodated in the queue (queue j) that is the target of the determination processing (No in step S103), the network controller 11 identifies the flow accommodated in the queue (queue j) as an abnormal flow (step S105).

Then, the network controller 11 proceeds to the determination processing for the next queue. Alternatively, the network controller 11 terminates the abnormal flow selection processing illustrated in the flowchart of FIG. 5 when the determination processing is completed for all queues that are targets of the determination processing.

If a plurality of flows are accommodated in the queue (queue j) that is the target of the determination processing (Yes in step S103), the network controller 11 checks whether an elapsed time is less than or equal to a preset value (step S104).

If the elapsed time is not less than or equal to the preset value (No in step S104) (that is, if the elapsed time exceeds the predetermined time), the network controller 11 identifies a flow accommodated in the queue (queue j) as an abnormal flow (step S105). In this case, the identified abnormal flow may be one in which a plurality of flows are aggregated. Then, the network controller 11 proceeds to the determination processing for the next queue. Alternatively, the network controller 11 terminates the abnormal flow selection processing illustrated in the flowchart of FIG. 5 when the determination processing is completed for all queues that are targets of the determination processing.

If the elapsed time is less than or equal to the preset value (Yes in step S104), the network controller 11 separates a flow accommodated in the queue (queue j) that is the target of the determination processing into two flows and allocates the two flows individually to two queues (queues j1 and j2).

Then, the network controller 11 monitors the two queues (queues j1 and j2) individually (step S106).

If the result of individually monitoring the two queues (queues j1 and j2) is that only one of the queues j1 and j2 has an observed data rate exceeding a registered data rate (Yes in step S107), the network controller 11 returns to step S103 to check whether a plurality of flows are accommodated in the queue (queue j1 or queue j2) the observed data rate of which exceeds the registered data rate (that is, whether a flow in which a plurality of flows are aggregated has been allocated to the queue).

If the result of individually monitoring the two queues (queues j1 and j2) is that both of the queues j1 and j2 have observed data rates exceeding their registered data rates (No in step S107), the network controller 11 changes the combination of flows accommodated in the queues j1 and j2 (step S108).

Then, the network controller 11 returns to step S103 to check whether a plurality of flows are accommodated in each of the queues (queues j1 and j2) the observed data rates of which exceed the registered data rates (that is, whether a flow in which a plurality of flows are aggregated is allocated to each of the queues).

In this way, the network controller 11 terminates the abnormal flow selection processing when a state is reached in which only one flow is accommodated in the queue that is the target of the determination processing for identifying an abnormal flow (No in step S103) or when a predetermined time has elapsed from the start of the abnormal flow selection processing (No in step S104).

The former is a termination condition when only one abnormal flow is present and can be identified. On the other hand, the latter is a termination condition when an abnormal flow cannot be uniquely identified within a predetermined time and the time is up.

It is also possible to employ, for example, a configuration wherein processing from allocation of a flow to a queue to observation of an input data rate is defined as one cycle and the determination is performed based on the number of cycles, instead of based on the elapsed time from the start of the abnormal flow selection processing.

In the processing of changing the combination of flows accommodated in the queues j1 and j2 illustrated in step S108, for example, all combinations of flows that can be allocated to the two queues may be tried sequentially.

As described above, when a state in which only one flow is accommodated in the queue is reached through the abnormal flow selection processing described above, the flow can be uniquely selected and isolated as an abnormal flow. Moreover, repeating the above abnormal flow selection processing at regular intervals makes it possible to constantly and continuously perform abnormal flow selection and isolation.

Functional Configuration of Network Controller

Figure 6:
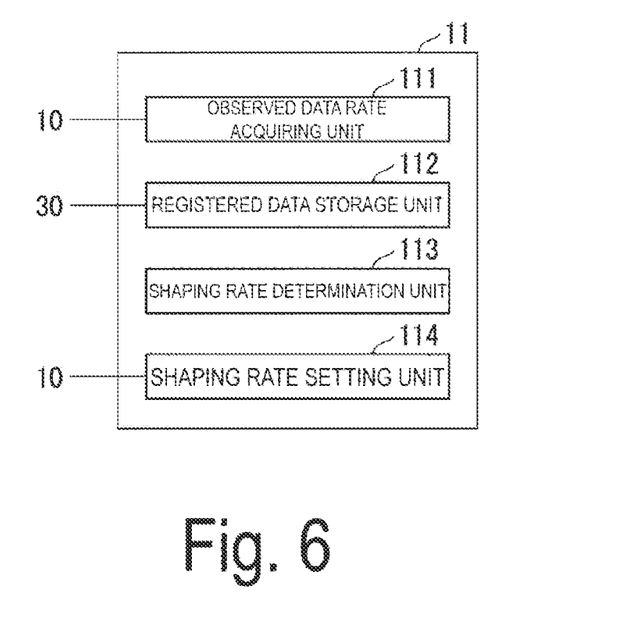
FIG. 6 is a block diagram illustrating a functional configuration of the network controller 11 according to the first embodiment of the present disclosure.

The functional configuration of the network controller 11 will be described below. FIG. 6 is a block diagram illustrating the functional configuration of the network controller 11 according to the first embodiment of the present disclosure. As illustrated in FIG. 6, the network controller 11 (communication control apparatus) includes an observed data rate acquiring unit 111, a registered data storage unit 112, a shaping rate determination unit 113, and a shaping rate setting unit 114.

The observed data rate acquiring unit 111 acquires, from each L2 switch 10, an observed data rate for each queue observed in the L2 switch 10 at regular intervals.

The registered data storage unit 112 (threshold value storage unit) stores the registered data list Ls1 including registered data rates that are predetermined threshold values for queues. The registered data rates or the registered data list Ls1 are acquired from the application server 30.

The registered data storage unit 112 includes a storage medium such as a semiconductor memory or a magnetic disk device.

The shaping rate determination unit 113 determines a shaping rate for each queue on the basis of an observed data rate acquired by the observed data rate acquiring unit 111 and a registered data rate stored in the registered data storage unit 112.

The shaping rate setting unit 114 transmits the shaping rate for each queue determined by the shaping rate determination unit 113 to each L2 switch 10 to set the shaping rate for each queue in each L2 switch 10.

Second Embodiment

Hereinafter, a second embodiment will be described.

In the first embodiment described above, the network controller 11 is configured to select an abnormal flow by comparing an input data rate (observed data rate) which is observed data with a threshold value (registered data rate). On the other hand, in the second embodiment, a network controller 11 is configured to select an abnormal flow using an increase in an input data rate which is observed data instead of using the input data rate.

The increase in the input data rate (hereinafter referred to as a "data rate increase") is calculated, for example, by subtracting an observed data rate which was observed one cycle ago from an observed data rate which is currently observed.

Configuration of Observed Data List

An example of a configuration of an observed data list Ls2' will be described below.

Figure 7:
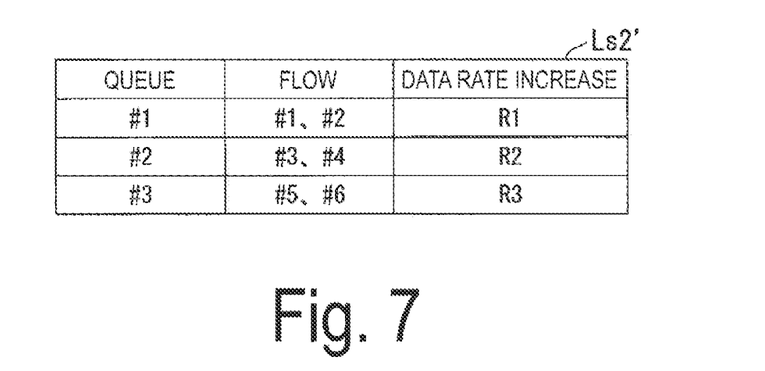
FIG. 7 is a diagram illustrating a configuration of an observed data list Ls2' generated by a network controller 11 according to a second embodiment of the present disclosure.

FIG. 7 is a diagram illustrating the configuration of the observed data list Ls2' generated by the network controller 11 according to the second embodiment of the present disclosure.

As illustrated in FIG. 7, the observed data list Ls2 is data in a list format in which identification numbers ("#1", "#2", and "#3") of queues input to each L2 switch 10, identification numbers (such as "#1" and "#2") of flows allocated to the queues, and data rate increases are associated with each other.

R1, R2, and the like are written as values of the data rate increases in the observed data list Ls2' illustrated in FIG. 7, but actually, the specific values of actual measurements of the data rate increases are registered.

As described above, the network controller 11 according to the second embodiment can select an abnormal flow based on the fact that a data rate increase exceeds a preset threshold value even when an observed data rate does not exceed a registered data rate. Thus, the network controller 11 according to the second embodiment can identify an abnormal flow before an observed data rate exceeds a registered data rate, thereby allowing appropriate shaping to be performed at an earlier timing.

An L2 network may generally accommodate a larger number of flows than the settable number of queues as described above. Such a conventional L2 switch collectively inputs a plurality of flows to one queue or shaper when a larger number of flows than the settable number of queues flow into the L2 switch.

Thus, when an input data rate is higher than an expected input data rate, the conventional L2 switch cannot identify a flow that has caused an increase in the input data rate (abnormal flow). Therefore, the conventional L2 switch performs shaping on an overall flow in which a plurality of flows are aggregated. This leads to shaping of flows other than abnormal flows, causing a problem of impairing the fairness of the entire network.

On the other hand, the network controller 11 of the L2 network 1 according to each of the above embodiments acquires input data rates from a plurality of L2 switches 10 at regular intervals. Then, the network controller 11 identifies an abnormal flow when an observed data rate exceeds a registered data rate (threshold value for the data rate registered in advance). Specifically, the network controller 11 inputs a plurality of flows, which have flowed into a queue that exceeds a threshold value, to individual queues and compares an observed data rate with a registered data rate in each queue as described above, thereby enabling selection of an abnormal flow that has caused an increase in the input data rate.

By having the configuration described above, the L2 network 1 according to each of the above embodiments can reduce the delay of flows other than abnormal flows and perform shaping without impairing the fairness of the entire network.

Although the embodiments of the present disclosure have been described above with reference to the drawings, it is clear that the above embodiments are merely examples of the present disclosure, and the present disclosure is not limited to the embodiments described above. Thus, addition, omission, substitution, and other modifications of the constituent components may be made without departing from the spirit and scope of the present disclosure.

The network controller 11 according to the above embodiments may be implemented by a computer. In such a case, the network controller may be implemented by recording a program for implementing the functions in a computer-readable recording medium, and causing a computer system to read and execute the program recorded in the recording medium. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is volatile memory inside a computer system that functions as a server or a client in the above-described case. Further, the above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST

1 L2 network
10 L2 switch

11 Network controller
20 Terminal
30 Application server
101-1 to 101-3 Shaper

The invention claimed is:

1. A communication control apparatus comprising:
a processor; and
a storage medium having computer program instructions stored thereon, wherein the computer program instructions, when executed by the processor, perform to:
acquire observed data rates, each of the observed data rates indicating input data rate of each of queues, and the observed data rates being observed in a layer 2 switch;
store a first threshold value of each of flows;
perform a comparison for each of the queues, the comparison comparing observed data based on one of the observed data rates of one of the queues with a second threshold value that is the sum of first threshold values of a plurality of flows allocated to the one of the queues, in a case that the observed data of the one of the queues to which the plurality of flows are allocated exceeds the second threshold value, change allocation of the plurality of flows such that the plurality of flows are allocated separately to the queues, and then repeatedly perform the comparing and the changing allocation until a state is reached in which only one flow is allocated to the one of the queues of which the observed data exceeds the second threshold value;
identify as an abnormal flow the one flow allocated to the one of the queues of which the observed data exceeds the second threshold value; and
set, in the layer 2 switch, a shaping rate of each of the queues such that the identified abnormal flow is shaped.

2. The communication control apparatus according to claim 1, wherein each of the first threshold values is a predetermined input data rate of each of the flows, and the observed data is observed input data rate to each of the queues.

3. The communication control apparatus according to claim 1, wherein each of the first threshold values is a predetermined increase in the input data rate of each of the flows, and
the observed data is an increase in the observed input data rate to each of the queues.

4. A communication control method comprising:
acquiring observed data rates, each of the observed data rates indicating input data rate of each of queues, and the observed data rates being observed in a layer 2 switch;
storing a first threshold value of each of flows;
performing a comparison for each of the queues, the comparison comparing observed data based on one of the observed data rates of one of the queues acquired in the acquiring with a second threshold value that is the sum of first threshold values of a plurality of flows allocated to the one of the queues stored in the storing,
in a case that the observed data of the one of the queues to which the plurality of flows are allocated exceeds the second threshold value, changing allocation of the plurality of flows such that the plurality of flows are allocated separately to the queues, and then repeatedly performing the comparing and the changing allocation until a state is reached in which only one flow is allocated to the one of the queues of which the observed data exceeds the second threshold value;
identifying as an abnormal flow the one flow allocated to the one of the queues of which the observed data exceeds the second threshold value; and
setting, in the layer 2 switch, a shaping rate of each of the queues such that the identified abnormal flow is shaped.

* * * * *